United States Patent Office 2,843,568
Patented July 15, 1958

2,843,568

POLYMERIC POLYETHER-POLYURETHANES

Anthony F. Benning, Woodstown, N. J., James G. Burt, Lincoln University, Pa., and Edward K. Gladding, New Castle, Del., assignors to E. I. du Pont de Nemours & Company, Wilmington, Del., a corporation of Delaware No Drawing. Application January 31, 1955
Serial No. 485,288

19 Claims. (Cl. 260—77.5)

This invention relates to polymeric polyether-polyurethanes containing in the molecule high formula weight polyether radicals. More particularly it relates to products of this type in which the polyether radicals contain both alkylene and also cyclic hydrocarbon radicals. Still more particularly it relates to polymeric reaction products of organic diisocyanates and high molecular weight polyether glycols containing hydrocarbon ring structures.

In copending application Serial No. 365,270 of Hill, filed June 30, 1953, there are described and claimed valuable elastomers obtained from the reaction between organic diisocyanates and high molecular weight polyalkylene ether glycols. These elastomers possess outstanding properties of abrasion resistance and ability to accept loading with fillers, and have excellent tensile strength and extensibility. They also may be subjected to low temperatures without becoming brittle. To some extent, however they do become stiff and lose their flexibility at low temperatures.

It is an object of this invention to provide a class of high molecular weight products which are useful elastomers having high tensile strength, abrasion resistance and elasticity and also having improved flexibility at low temperatures.

According to the present invention, useful polymeric products are obtained by reacting a molar excess of an organic diisocyanate with a polyether glycol having a molecular weight of at least 750 and having the formula HO—G—OH, in which O—G—O represents a long chain bivalent radical and consisting of a plurality of smaller bivalent hydrocarbon radicals linked to one another by chalcogen atoms of atomic weight less than 33, i. e., oxygen or sulfur, the majority of the said hydrocarbon radicals being alkylene radicals having up to 10 carbon atoms and at least one of the said hydrocarbon radicals containing a carbocyclic ring structure. This carbocyclic ring structure may be either aromatic or cycloaliphatic. The resulting product may be converted to a higher molecular weight compound by reaction with a chain extending agent such as water or a diamine. The chain extended product may then be cured to give a vulcanized elastomer of high quality.

Another method of obtaining the products of this invention is to convert long chain polyether glycols of the type described above to the corresponding bischloroformates by reacting them with phosgene in an inert solvent, such as toluene, and subsequently to react the bischloroformates in water solution in the presence of an acid acceptor and more phosgene with a primary diamine, corresponding to the diisocyanate which would be used in the method described above.

A preferred class of polyalkylene-arylene ether glycols useful in this invention are those having the formula:

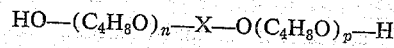

in which $n$ and $p$ are integers large enough to give each of the radicals within the parentheses formula weights between 500 and 1000 and X is a phenylene, naphthylene, cyclohexylene or xylylene radical. Other representative polyether glycols of the type useful in preparing the elastomers of this invention are as follows, $n$ and $p$ representing in each case integers large enough to give the polyether glycol as a whole a molecular weight of at least 750:

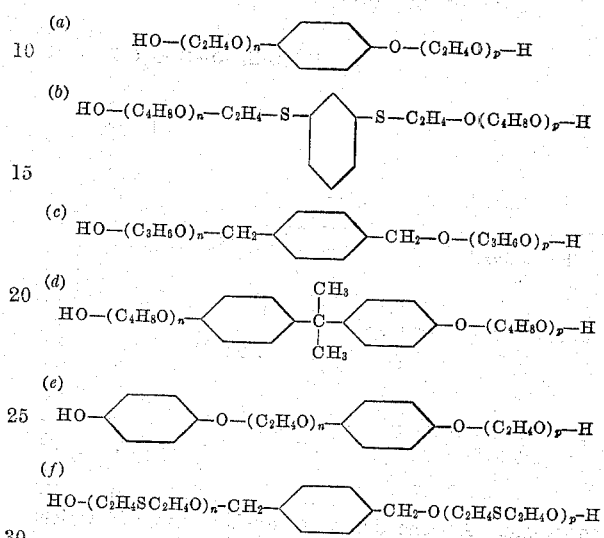

The polyether glycols preferably contain either one or two hydrocarbon radicals containing a ring structure, although glycols containing more than two such groups may be used.

Glycols of this general type may be prepared by any of the various conventional methods of synthesis. These include the following typical reactions:

(a)

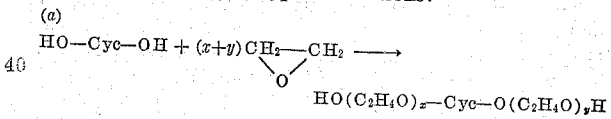

where Cyc is a carbocyclic radical and $x$ and $y$ are integers. Other $\alpha$-$\beta$ cyclic ethers such as propylene oxide may be used in place of ethylene oxide.

(b) 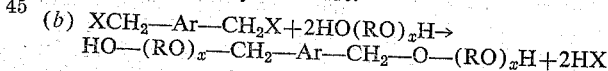

where Ar is an arylene radical, R is an alkylene radical of up to 10 carbon atoms, $x$ is an integer large enough to give $(RO)_x$ a formula weight of at least 500, and X is chlorine or bromine.

(c) 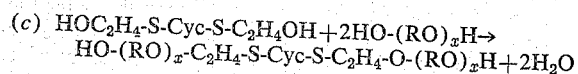

where R and $x$ have the same significance as in (b) and Cyc is a saturated or unsaturated carbocyclic radical.

(d) 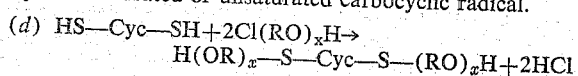

where R, $x$ and Cyc have the significance given above.

(e) 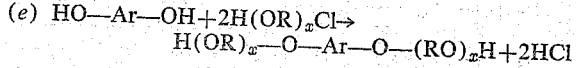

where Ar, R and $x$ have the significance given above.

(f) 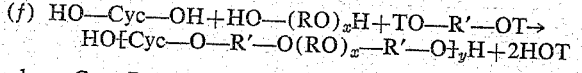

where Cyc, R and $x$ have the significance given above, R′ is an alkylene radical, T is the p-toluene sulfonyl radical, $CH_3C_6H_4SO_2$—, and $y$ is an integer. Although the product is here represented as having a fixed recurring structure, actually the Cyc, R' and R portions of the molecule will be randomly distributed.

(g) TO-hydrocyclic-OT+2HO—(RO)$_x$H→
HO—(RO)$_x$-hydrocyclic-O—(RO)$_x$H+2HOT where hydrocyclic represents a cycloaliphatic radical and R, $x$ and T have the significance given above.

(h)
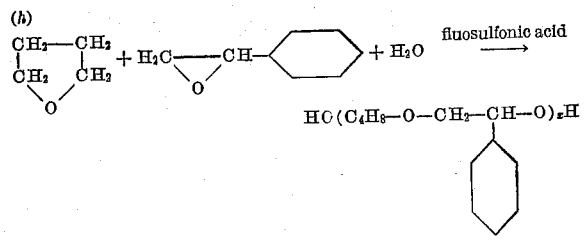

Here again the position of the tetramethylene and of the phenylethylene radicals is probably completely random.

The polyether glycols useful in this invention have molecular weights of at least 750 and may be as high as 10,000, although those of molecular weight between 750 and 3500 are preferred.

Any of a wide variety of organic diisocyanates may be used in the reaction, including aromatic, aliphatic, and cycloaliphatic diisocyanates and combinations of these types. Representative compounds include 2,4-tolylene diisocyanate, hexamethylene diisocyanate, 4-methoxy-m-phenylene diisocyanate, 1,5-naphthylene diisocyanate, 4,4'-methylenediphenyl diisocyanate and 1,4-cyclohexylene diisocyanate. Arylene diisocyanates, i. e., those in which each of the two isocyanate groups is attached directly to an aromatic ring, are preferred. Dimers of the monomeric diisocyanates and di(isocyanatoaryl)ureas, such as di(3-isocyanato-4-methylphenyl)urea, may be used.

After the initial reaction between the polyalkylene-arylene or -cycloalkylene ether glycol with the diisocyanate, the prepolymer is reacted with a chain-extending agent to increase the molecular weight to the range in which elastomers are formed. The chain-extending agent is a compound containing a plurality of active hydrogen atoms capable of reacting with isocyanates, no more than two atoms in the molecule having active hydrogen attached thereto. Water, hydrogen sulfide, and organic compounds containing two and only two atoms in the molecule to which are attached active hydrogen atoms are useful chain-extending agents. The term "active hydrogen atoms" refers to hydrogens which display activity according to the Zerewitinoff test as described by Kohler in J. Am. Chem. Soc., 49, 3181 (1927). Active hydrogen is present in —OH, —SH, —NH—, —NH$_2$, —COOH, —CONH$_2$, —CONHR where R represents an organic radical, —SO$_2$OH, —SO$_2$NH$_2$, and —CSNH$_2$ groups. The chain-extending agent may be aliphatic, aromatic, cycloaliphatic or of mixed type. Typical organic chain-extending agents are hexamethylenediamine, m-phenylenediamine, propylene glycol, mono-ethanolamine, adipic acid, butane-1,4-disulfonic acid, p-hydroxybenzoic acid, hexamethylene-1,6-dithiol, ethylene glycol, terephthalic acid, 2,4-tolylenediamine and p-aminophenol. The chain-extending agent is preferably a relatively simple compound containing no more than eight carbon atoms.

To form the prepolymer, the polyether glycol and the diisocyanate are mixed together, usually in molar proportions of from 1.5 to 2.5 moles of the diisocyanate for each mole of the glycol. It is convenient to carry out this mixing step in heavy-duty mixing equipment, such as a Werner-Pfleiderer mixer. As a result of the excess of diisocyanate used, the resulting prepolymer will have terminal —NCO groups and will have the formula OCN—(B—NH—CO—O—G
—O—CO—NH)$_n$—B—NCO in which B represents a bivalent organic radical derived from the diisocyanate, $n$ is an integer, and O—G—O represents the bivalent radical resulting from removal of the terminal hydrogen atoms from the polyether glycol. When the molar ratio of diisocyanate to glycol is only slightly greater than 1:1, the molecular weight of the prepolymer is relatively large. Thus at a ratio of 20:19, $n$ in the formula above should be 19. As the ratio increases, the molecular weight becomes smaller and at a ratio of 2:1, $n$ in the formula above will be 1, i. e., the prepolymer will consist of a single polyether residue having diisocyanate attached to each end. When the ratio is higher than 2:1 there will be some free diisocyanate present in the prepolymer.

After formation of the prepolymer, the water or other chain-extending agent is added and mixing is continued. A rubbery polymer forms which may then be removed from the mixer and sheeted out on a rubber mill. In case the polymer still contains free isocyanate groups, it is desirable that either just before removing from the mixer or after transferring to the rubber mill, there be added a stabilizing amount of a primary or secondary monoamine, as described and claimed in copending application S. N. 379,291 of Nelson and Verbanc, filed September 9, 1953. Instead of carrying out the preparation of the polymer in the heavy-duty mixing machinery, the prepolymer may be made in a vessel having simple agitation, and only the chain-extension step performed in the heavy-duty equipment. Both steps may be carried out in a solvent if desired. It is also possible to perform the step of chain-extension by heating the mixture of prepolymer and chain-extending agent in a container without agitation.

The amount of the chain-extending compound used may vary considerably. The chain-extending agent serves not only to link together the polymer units and so to lengthen the polymer chain, but also to provide active hydrogen atoms which serve as sites for cross-linking. It is thus highly desirable that some chain extender be employed. On the other hand, if the reaction product is permitted to contain too high a proportion of the chain-extending agent, the desirable properties conferred by the long chain polyether glycol are less pronounced. It is generally advantageous to have the molar ratio of long chain polyether glycol to chain-extending agent at least 1:9 and no more than 9:1. In any case, enough of the long chain compound should be incorporated into the reaction product that the long chain residues resulting from it comprise at least 35% of the total weight of the product. In the preferred products of this invention the long chain residues comprise from 60 to 95% of the weight of the product.

In general, temperatures of 50 to 100° C. are suitable for the formation of the prepolymer. The reaction takes place slowly at room temperature, while temperatures above 125° C. are seldom required even when the molecular weight of the prepolymer is rather high. It is usually desirable to use a temperature of 70 to 150° C. during the chain-extension step. When the reaction is carried out in a heavy-duty mixer, the heat of reaction together with the heat generated mechanically raises the temperature without the need of appying any additional heat. In fact, cooling is frequently necessary.

The uncured chain-extended polymers are ordinarily cured by first milling with a diisocyanate and whatever additional compounding agents such as fillers as may be desired, and thereafter heating in a mold under pressure. In case the uncured product contains free isocyanate groups it may be unnecessary to add any additional curing agent. Ordinarily, however, from 1 to 20% of a polyisocyanate, usually a diisocyanate, is added. This curing agent may be any of the diisocyanates mentioned previously as useful in the initial reaction with the polyether glycol. Conventional rubber processing equipment is used. Curing proceeds readily at temperatures of 100 to 150° C., using only enough pressure to force the compounded polymer to assume the form of the mold. The elastomers will also cure slowly at room temperature, particularly when the uncured product is in the form of thin sheets.

Pliable, unsupported films may be formed by dissolving the compounded material in a solvent such as methyl-ethyl ketone or tetrahydrofuran and spreading it out on a surface and permitting the solvent to evaporate. It is also possible to prepare films directly from the prepolymer, in case a reasonable excess of diisocyanate is present, by dissolving the prepolymer in a solvent and spreading in a thin layer. As the solvent evaporates, the moisture in the air acts as a chain-extending agent and the product simultaneously is chain-extended and cured.

As briefly discussed above, when a long chain polyether glycol and an organic diisocyanate react with one another, an initial reaction takes place with the formation of a linear polymer containing urethane linkages. The reaction may be represented as follows:

OCN–B–NCO+HO–G–OH→
. . . –B–NH–CO–O–G–O–CO–NH–B–NH–CO–O–G–O–CO–NH–B– . . .

where B is a bivalent organic radical and O—G—O is the residue obtained by removing the terminal hydrogen atoms from the long chain polyalkylene-arylene or -cycloalkylene ether glycol having a formula weight of at least 750. If the diisocyanate is present in molar excess, this polymer will have terminal isocyanate groups and may be represented by the formula OCN–B(NH–CO–O–G–O–CO–NH–B)$_n$NCO in which O—G—O and B have the significance stated above, and $n$ is an integer greater than zero. These polymers may then react through their free isocyanate groups with chain extending agents containing active hydrogen. The reactions of isocyanates with the active hydrogen-containing groups present in the various typical chain-extending agents are described in the literature as proceeding as follows:

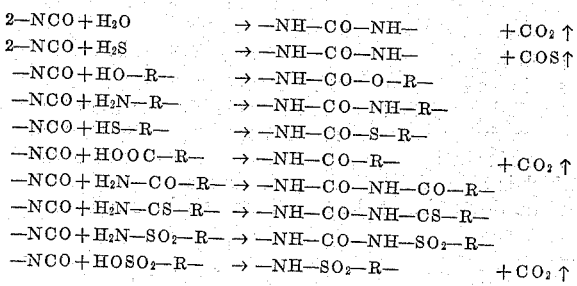

It is apparent from the foregoing table that when water and hydrogen sulfide are used as chain-extenders, there is a carbonyl linking group between the imino groups, which imino groups are attached to the isocyanate residues. When the other typical chain-extenders are used, an acyl radical is attached to the imino group. Thus, when these other typical chain-extenders react with two free isocyanate groups of the isocyanate-terminated prepolymer units and, if present, molecules of the original diisocyanate, a diacyl radical is the connecting radical between the imino groups which are attached to the isocyanate residues. These diacyl radicals are non-polymeric and are hereinafter referred to by the letter "Q."

After reaction of the chain-extending agents with the isocyanate-terminated prepolymer and any excess diisocyanate which may be present, the resulting polymeric product is a polymer being comprised essentially of structural units having the formula

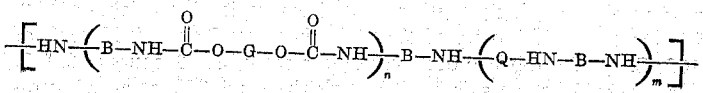

wherein O—G—O is a long-chain bivalent organic radical having a formula weight of at least 748 and consisting of a plurality of smaller bivalent hydrocarbon radicals linked to one another by chalcogen atoms of atomic weight less than 33, the majority of the said hydrocarbon radicals being alkylene radicals having up to 10 carbon atoms with at least one of the said hydrocarbon radicals containing a carbocyclic ring structure; B is a bivalent organic radical, said radical being inert to isocyanate groups; Q is a radical selected from the group consisting of a carbonyl radical and a non-polymeric diacyl radical; $n$ is an integer greater than zero; and $m$ is an integer including zero; each of the said structural units being connected to the next by a radical Q having the significance defined above.

When water or hydrogen sulfide is the chain-extending agent, the reaction taking place between each molecule of the extending agent and isocyanate groups results in the formation of a urea linkage. The chain extended product will then comprise a plurality of —B(NH—CO—O—G—O—CO—NH—B)$_n$— prepolymer units joined to one another or to —B— radicals, in case some of the original diisocyanate was available for reaction, by urea linkages,

—NH—CO—NH—

The relative proportions of the prepolymer units and of the —B— radicals will depend on the molar ratios of reactants and the order in which the several ingredients are added. This linear chain extended polymer has a polymer chain consisting predominantly of a plurality of bivalent organic radicals, each separated from the next by an intervening carbonyl group. The bivalent organic radicals in the case of the water or the hydrogen sulfide extended product consist of ($a$) diimino radicals,

—NH—B—NH— derived from the organic diisocyanate and ($b$) long chain radicals, O—G—O, which are derived from the long chain polyether glycols.

When an organic chain-extending agent other than a sulfonic acid is reacted with the prepolymer, either alone or in the presence of excess diisocyanate, the chain-extending bridge which is formed will have the formula —NH—CO—E—CO—NH—, where —E— is the residue resulting from removal of the terminal hydrogens from the chain-extending agent. In this case, the resulting polymeric product also has a polymer chain consisting predominantly of a plurality of bivalent organic radicals separated by intervening carbonyl groups, in which the bivalent radicals are ($a$) diimino radicals, —NH—B—NH—, derived from the diisocyanate, ($b$) long chain radicals, O—G—O, derived from the long chain polyether glycols, and ($c$) bivalent radicals, —E—, derived from the organic chain-extending agent. The radicals represented by —E— may terminate in an oxygen or sulfur atom, an imino or other non-hydrocarbon radical, or if derived from a carboxylic acid may terminate simply in carbon.

When an organic sulfonic acid is used as the chain-extending agent, the prepolymer units and residues of the diisocyanates will be linked by the group

—NH—SO$_2$—E—SO$_2$—NH— in which —E— is the residue of the chain-extending agent remaining after removal of the sulfonic acid groups. As in the class described above, the chain extended polymer will have a polymer chain consisting predominantly of a plurality of bivalent organic radicals derived from the diisocyanate, the long chain polyether glycol, and the chain extender. Instead of all of these organic bivalent radicals being linked to one another by carbonyl groups, however, in this case some of the units will be connected by sulfonyl groups.

Both the long chain polyether glycol and the chain-extending agent ordinarily enter the polymer chain by reacting with isocyanate groups. Accordingly, each of the intervening carbonyl or sulfonyl linking groups in the reaction product is normally attached directly to at least one imino group, derived from an isocyanate group, regardless of the nature of the chain-extending agent. In many cases, an intervening carbonyl group will be attached to two imino radicals, i. e., it will be part of a urea linkage, as for example when the chain-extending agent terminates in amino groups or is water or hydrogen sulfide. In many cases, the portion of the polymer chain separating one long chain polyether residue from the next will contain a plurality of these urea linkages. When the chain extender is water, hydrogen sulfide or a diamine, which includes the preferred chain extenders, all of the bivalent organic radicals in the chain joined to one another by carbonyl groups will be either diimino radicals or the residues from the long chain polyether glycol. In the preferred product, from 55 to 75% of the bivalent organic radicals will be tolylenediimino radicals and the remainder will be polyether glycol residues, these radicals being separated from one another by intervening carbonyl groups.

It is apparent that if the long chain polyether glycol, the diisocyanate, and the chain-extending agent are reacted in suitable proportions simultaneously, or if suitable amounts of the chain-extending agent are first reacted with diisocyanate under suitable conditions before adding to the long chain glycol or to the prepolymer, the resulting polymeric product will in each case contain a plurality of bivalent organic radicals derived from the same sources and linked to one another by means of the same intervening groups as in the product which is obtainable by first reacting the long chain polyether glycol with the diisocyanate and thereafter reacting the resulting prepolymer with a chain extender, as described above.

The products of this invention and the method of preparing them are illustrated by the following examples, in which parts are by weight unless otherwise indicated.

EXAMPLE 1

(A) *Preparation of polyether glycol*

To a mixture of 2 molar parts of a polytetramethylene ether glycol having a molecular weight of 985 and 1 molar part of $\alpha,\alpha'$-dibromo-p-xylene are added 2.5 molar parts of potassium hydroxide in the form of pellets over a period of 2–4 hours at 80° C. while stirring. Stirring is continued for an additional 24 hours at 80° C. The reaction mass is poured into an excess of aqueous hydrochloric acid to neutralize the excess potassium hydroxide. The polymeric glycol is washed by agitating with water, settling and separating layers until the polymer is acid free. It is then dried by heating to about 80° C. under vacuum. The resulting polyalkylenearylene ether glycol has a molecular weight of 2070.

(B) *Preparation of polymer*

80 parts of the polytetramethylene-xylene ether glycol, prepared as described above, and having the approximate formula:

and 12.2 parts of 2,4-tolylene diisocyanate are reacted in a Werner-Pfleiderer mixer at 80–85° C. for 2.5 hours after which the temperature is raised to 100–110° C. for 25 minutes. There are then added 3.6 parts of powdered m-tolylenediamine and mixing is continued for 3 minutes. The product turns to a dry crumbly mass which is removed from the mixer and sheeted out on a rubber mill.

100 parts of this polymer and 4 parts of 1,3-bis(3-isocyanato-4-methylphenyl)urea are thoroughly mixed on a rubber mill and then cured by heating in a mold under pressure at 134° C. for 30 minutes. The product has the following properties at 25° C.:

Tensile strength at the break_____lbs./sq. in__ 4470
Modulus at 300% elongation_____lbs./sq. in__ 1660
Elongation at the break_____percent__ 510

The product is not frozen, but remains elastic, after storage for 2 weeks at −20° C.

EXAMPLE 2

(A) 41.2 parts of the polyalkylene-arylene ether glycol of Example 1(A) and 7 parts of 2,4-tolylene diisocyanate are stirred together for 2 hours at 90° C. The mass is cooled somewhat and 150 parts of tetrahydrofuran are added to dissolve the polymer. Then 3.6 parts of water are thoroughly stirred in and the mass is allowed to stand for 3 days. There are no free —NCO groups left. The tetrahydrofuran is evaporated and the rubbery polymer is heated for 6 hours at 80° C. in a vacuum oven to remove residual tetrahydrofuran.

100 parts of the polymer and 8 parts of 1,3-bis(3-isocyanato-4-methylphenyl)urea are thoroughly mixed on a rubber mill and cured by heating in a mold at 134° C. for 30 minutes.

(B) For comparison, a polytetramethylene ether glycol of molecular weight 2100 (compared to 2070 for the above) is converted to an elastomer by the same procedure and cured in the same way.

The effect of temperature on the elastic properties of the polymers is determined by stretching a test specimen to 270% of its length, immersing in hexane at −60° C., letting it stand 5 minutes, releasing the stretching means, raising the temperature of the bath 1° C. per minute, and observing the retraction of the sample as a function of time. The T–50 value is the temperature at which the sample has retracted to one-half of the original elongation. This test is essentially A. S. T. M. T–50 test, designated D–599–40T, modified by the use of hexane as the coolant instead of acetone and by stretching to an absolute elongation of 270% instead of to a value which is 75% of the breaking elongation.

The properties of the two elastomers is as follows:

| | A | B |
|---|---|---|
| Tensile strength at the break, lbs./sq. in | 4,210 | 4,650 |
| Modulus at 300% elongation, lbs./sq. in | 1,030 | 920 |
| Elongation at the break, percent | 480 | 490 |
| Hardness, Shore, at 25° C | 75 | 73 |
| T–50 | −3° C. | +7° C. |

Sample "A" remains flexible at −20° C. for at least 6 days while the control "B" becomes frozen and stiff in 3 hours at −20° C.

EXAMPLE 3

A polyalkylene-cycloalkylene ether glycol is prepared by the method described in Example 1(A) except that hexahydroterephthalyl di-p-toluene sulfonate is used in place of the $\alpha,\alpha'$-dibromo-p-xylene. The hexahydroterephthalyl di-p-toluene sulfonate is prepared from 1,4-cyclohexananedimethanol and p-toluene sulfonyl chloride by conventional esterification in pyridine solution. The resulting polyether glycol has a molecular weight of 1880.

56.1 parts of this polyether glycol and 10.65 parts of 2,4-tolylene diisocyanate are stirred for 2 hours at 80° C. The mass is cooled somewhat and 200 parts of tetrahydrofuran are added to dissolve the polymer. Then 5.4 parts of water are thoroughly stirred in and the solution is allowed to stand 24 hours. The tetrahydrofuran is evaporated and a clear, millable polymer is recovered.

100 parts of the polymer and 8 parts of 1,3-bis(3-isocyanato-4-methylphenyl)urea are thoroughly milled together on a rubber mill. The product is cured in a mold at 134° C. in a press for 30 minutes.

The resulting elastomer has the following properties:

Tensile strength at the break _____ lbs./sq. in __ 3620
Modulus at 300% elongation _____ lbs./sq. in __ 730
Elongation at the break _____ percent __ 650
Shore hardness at 25° C _____ 76
T-50 value _____ °C __ −1.5

This product remains flexible at −20° C. for at least 3 days.

EXAMPLE 4

(A) *Preparation of polyether*

A mixture of 1442 parts of tetrahydrofuran and 160 parts of phenylethylene oxide is cooled at −10° C. and 160 parts of fluosulfonic acid are added dropwise while agitating vigorously. The temperature is held at −10° C. during the one-hour period of addition. The cooling jacket of the vessel is adjusted to 0° C. and the mass is held for 16 hours. At the end of this time it is a solid mass. The mass is then subjected to steam distillation. About 260 parts of tetrahydrofuran distil over. The residual polymeric glycol is washed with boiling water by agitation and decantation until it is acid free and is then dried under vacuum to yield 925 parts of polytetramethylene-phenylethylene ether glycol of molecular weight 2420 (hydroxyl number 46.3; water content 0.39%; S—nil).

(B) *Preparation of polymer*

111 parts of the polyether glycol prepared as described above and 20.1 parts of 2,4-tolylene diisocyanate are mixed at 80° C. in a Werner-Pfleiderer mixer for 2 hours. The temperature is reduced to 50° C. and 1.38 parts of water are added. The mass is mixed for 65 minutes while raising the temperature gradually to 120° C. The mass becomes rubbery and it is necessary to apply the ram to the mixer to keep the product in the blades of the mixer. It is mixed 5 minutes longer at 120° C. with the ram on. The polymer is then removed from the mixer and sheeted out on a rubber mill where 0.8 part of piperidine per 100 parts of polymer is added as a stabilizer.

100 parts of the polymer and 4 parts of 1,3-bis(3-isocyanato-4-methylphenyl) urea are thoroughly mixed on a rubber mill and the mass is cured in molds in a press at 134° C. for 30 minutes.

The cured slabs have the following properties:

Tensile strength at the break _____ lbs./sq. in __ 4925
Modulus at 300% elongation _____ lbs./sq. in __ 725
Elongation at the break _____ percent __ 700

EXAMPLE 5

A polyalkylene-arylene ether glycol is prepared by the procedure described in Example 1(A) except that different proportions of reactants are used. There are employed in this preparation 4 molar parts of polytetramethylene ether glycol, 3 molar parts of the dibromoxylene and 15 molar parts of potassium hydroxide. The resulting polyether glycol has a molecular weight of 2920.

92 parts of this polyalkylene-arylene ether glycol and 11 parts of 2,4-tolylene diisocyanate are mixed in a Werner-Pfleiderer mixer at 80° C. for 2.5 hours. 2.7 parts of water are added and mixing is continued for 65 minutes at 80° C. The soft polymer is removed and stabilized by milling on a rubber mill with 0.7 part of piperidine per 100 parts of polymer.

The polymer is then milled with 4 parts of 1,3-bis(3-isocyanato-4-methylphenyl)urea per 100 parts of polymer and cured by heating in molds in a press at 134° C. for 30 minutes. The resulting elastomer has the following properties:

Tensile strength at the break _____ lbs./sq. in __ 3010
Modulus at 300% elongation _____ lbs./sq. in __ 360
Elongation at the break _____ percent __ 780

EXAMPLE 6

30.6 parts of the polyalkylene-arylene ether glycol used in Example 5 are heated for 30 minutes to remove traces of water. Then 2.32 parts of 2,4-tolylene diisocyanate are added and the mass is stirred for 2 hours at 100° C. It is cooled and 200 parts of dried (distilled over sodium) tetrahydrofuran are added to dissolve it.

In another vessel, 0.5 part of m-tolylenediamine is dissolved in 50 parts of dried tetrahydrofuran. To this is added the solution of polymer in tetrahydrofuran over a period of one hour while stirring. After stirring a further half hour, the tetrahydrofuran is evaporated to leave a soft rubbery polymer.

The polymer is compounded on a rubber mill with 4 parts of 1,3-bis(3-isocyanato-4-methylphenyl)urea per 100 parts of polymer and cured in molds in a press at 134° C. for 30 minutes. The snappy, rubbery slabs show the following properties at 25° C.:

Tensile strength at the break _____ lbs./sq. in __ 3170
Modulus at 300% elongation _____ lbs./sq. in __ 600
Elongation at the break _____ percent __ 840

EXAMPLE 7

20.6 parts of the polyalkylene-arylene ether glycol of Example 1(A) and 2.27 parts of hexamethylene diisocyanate are stirred together for one hour at 80° C. and then two hours at 110° C. The mass is cooled and 100 parts of tetrahydrofuran are added to dissolve it. This solution is added slowly to a well-stirred solution of 0.46 part of hexamethylenediamine in 50 parts of tetrahydrofuran at room temperature (about 23–26° C.). The resulting viscous mass is heated to evaporate the tetrahydrofuran and the rubbery residue is heated on a rubber mill at 100° C. and sheeted off. On compounding with 6 parts of 1,3-bis(3-isocyanato-4-methylphenyl)-urea on a rubber mill and curing in a mold in a press at 134° C. for 30 minutes, a soft rubbery product is obtained which has a tensile strength at the break of 2800 lbs./sq. in.

EXAMPLE 8

103 parts of the polyalkylene-arylene ether glycol of Example 1(A) and 10.6 parts of 2,4-tolylene diisocyanate are mixed together in a Werner-Pfleiderer mixer for two hours at 80° C. and then one hour at 110° C. The mass is cooled to 100° C., 1.71 parts of m-tolylenediamine are added and mixing is continued for 20 minutes. The rubbery polymer is removed from the mixer and sheeted out on a rubber mill.

100 parts of the elastomer are thoroughly mixed with 4 parts of 1,3-bis(3-isocyanato-4-methylphenyl)urea on a rubber mill and cured by heating in a mold in a press at 134° C. for 30 minutes. The rubbery slab resulting shows the following properties:

Tensile strength at the break _____ lbs./sq. in __ 4570
Modulus at 300% elongation _____ lbs./sq. in __ 730
Elongation at the break _____ percent __ 650

EXAMPLE 9

A polyalkylene-arylene ether glycol is prepared by the method described in Example 1(A) except that instead of the dibromoxylene there is used 1,4-bis-bromomethyl naphthalene, and there are used 3.1 molar parts of potassium hydroxide instead of 2.5. The 1,4-bis-bromomethyl naphthalene is prepared by the brom-methylation of naphthalene using HBr and formaldehyde. The resulting polyether glycol has a molecular weight of 2000.

50 parts of this polyalkylene-arylene ether glycol and 9.4 parts of 2,4-tolylene diisocyanate are stirred together for two hours at 75° C. The mass is cooled somewhat and 150 parts of tetrahydrofuran containing 4.5 parts of water are stirred into the mass. After standing for 24 hours the solution becomes a rubbery gel. The solvent is evaporated off and the polymer is sheeted on a mill at 134° C. The raw polymer is exposed to a —20° C. temperature for 3 days and remains soft and rubbery.

EXAMPLE 10

(A) *Preparation of glycol*

110 parts of resorcinol and 2 parts of potassium hydroxide are heated to 110° C. and gaseous ethylene oxide is introduced into the well-stirred mass. A total of 1160 parts of ethylene oxide are added over a period of 15 hours at 110–120° C., the reaction maintaining temperature without additional heating. The molecular weight of the product so obtained is 1040, calculated from the hydroxyl number.

(B) *Preparation of Polymer*

104 parts of the above polyether glycol containing 0.38% water and 26.8 parts of 2,4-tolylene diisocyanate are mixed in a Werner-Pfleiderer mixer at 100° C. for 2.5 hours. The mass is then cooled to 80° C. and 3.6 parts of water are added. Mixing is continued for 12 minutes. The soft rubbery polymer is removed to a rubber mill where 1.05 parts of piperidine per 100 parts of polymer are added to stabilize it. On compounding and curing as in previous examples, a soft rubbery vulcanizate is obtained.

EXAMPLE 11

(A) *Preparation of polyether glycol*

43.2 parts of sodium ethoxide are dissolved in 165 parts of anhydrous ethanol and the solution added to 45 parts of thioresorcinol. After the thioresorcinol is dissolved, the solution is heated to reflux and 51 parts of ethylene chlorhydrin are added slowly while agitating the reaction mass. Heating and stirring are continued for 30 minutes after the addition is complete. The reaction mass is cooled and filtered to remove inorganic salts. The filter cake is washed with a little ether. The solvent is then evaporated and the residue distilled under vacuum. A fraction of 94 parts boiling at 197–203° C. at 0.25 mm. of mercury pressure is collected. The sulfur analysis shows 27.9% which is the theoretical value for di-($\beta$-hydroxyethyl)thioresorcinol.

139.8 parts of polytetramethylene ether glycol of molecular weight 1100, 14.6 parts of the di-($\beta$-hydroxyethyl)-thioresorcinol, and 1.54 parts of p-toluene sulfonic acid monohydrate and heated together, while stirring, for 2.3 hours at 200–210° C. During this time water distills off. The resulting product is purified by boiling with 10% sodium carbonate solution to remove the catalyst. It is then washed with dilute hydrochloric acid and finally washed with water until it is neutral. The water is evaporated off under vacuum, the product diluted with benzene and treated with 2% of its weight of activated charcoal. The mass is then filtered and the benzene removed under vacuum. The polyether glycol obtained (69.8 parts) has the following general structure and properties:

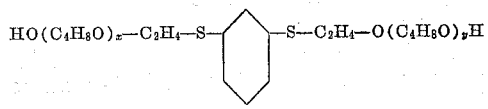

| | |
|---|---|
| Hydroxyl No. | 48.6 |
| Sulfur _____percent__ | 3.88 |
| Water _____do____ | 0.24 |
| Mol. Wt. | 2310 |

(B) *Preparation of polymer*

11.58 parts of the above polyether glycol and 2.29 parts of 2,4-tolylene diisocyanate are heated together at 60° C. for 19 hours. 12.55 parts of the product are dissolved in 50.84 parts of dry tetrahydrofuran and 1.05 parts of water are added. The solution is allowed to stand for 5 days at room temperature for chain extension to take place. The solvent is evaporated and the polymer dried in a vacuum oven at 80° C. for 3 hours.

10 parts of the polymer are milled on a rubber mill and compounded with 0.8 part of 1,3-bis(3-isocyanato-4-methylphenyl)urea. The polymer is cured in a mold in a press at 134° C. for one hour. The resulting rubbery slab has a tensile strength of 2320 lbs./sq. in. at the break and remains flexible and elastic after 7 days at —20° C.

EXAMPLE 12

(A) *Preparation of polyalkylene-arylene ether glycol*

924 parts of dry tetrahydrofuran are cooled to 0° C. in an agitated vessel and 70 parts of anhydrous hydrogen chloride are added while stirring at 0° C. Then 103 parts of anhydrous ferric chloride are added, over about 5 minutes, keeping the temperature at 0°–10° C. The temperature is then raised to 23–24° C. and the mixture is stirred for 2.25 hours. The dark reaction mass is poured into 1000 parts of water, during which considerable heat is evolved. The organic phase is extracted with 180 parts of benzene. The benzene layer is washed with water until the wash water is neutral to Congo red paper. The benzene solution (with about 300 parts added benzene to decrease viscosity) is then filtered through a bed of activated charcoal and diatomaceous earth. The benzene is evaporated by heating, finally at 70° C. under a pressure of 1 mm. of mercury, with a slow stream of nitrogen bubbling through the viscous mass. 406 parts of a straw-colored viscous liquid, which is a semi-solid wax at room temperature is obtained. It is a polytetramethylene chlorhydrin of the empirical formula $Cl(C_4H_8O)_xH$. The analysis shows a hydroxyl number of 41.7 and 3.2% organic chlorine. This corresponds to a number average molecular weight of 1215. The analysis indicates that about 10 mol percent of the dichloride is present.

11.4 parts of diphenylolpropane are dissolved in 112 parts of this polytetramethylene ether chlorhydrin by stirring at 60–70° C. for 30 minutes. Then 7.3 parts of powdered potassium hydroxide are added, the temperature is raised to 100–110° C., and stirring is continued at 100–110° C. for 24 hours. The temperature is then raised to 150–160° C. and stirring is continued for 95 hours. The mass is cooled and poured into 500 parts of water with stirring. The organic portion is extracted with 320 parts of carbon tetrachloride. The $CCl_4$ layer is washed twice with 5% sodium hydroxide solution. It is stirred vigorously with dilute hydrochloric acid solution until the mixture is definitely acid. Then the $CCl_4$ layer is washed with water until neutral. The $CCl_4$ is evaporated off, the residue is taken up in benzene and the water removed by azeotropic distillation. The benzene solution is clarified by filtration through diatomaceous earth and the benzene is removed by evaporation. Analysis shows:

| | |
|---|---|
| OH No. | 38.5 |
| $H_2O$ _____percent__ | 0.44 |
| Org. Cl. | 0.12 |
| Inorg. Cl. | 0.19 |
| Mol wt. | 2910 |

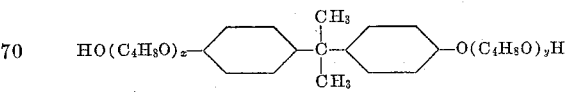

(B) *Preparation of elastomers*

10 parts of this polyalkylene-arylene ether glycol and 1.46 parts of 2,4-tolylene diisocyanate are heated at 90–

100° C. for 1.5 hours. 35 parts of anhydrous tetrahydrofuran are added to form a solution. 0.62 part of water are added and the solution is allowed to stand for 58 hours at room temperature for chain extension to take place. The tetrahydrofuran is removed by heating and the rubbery residue is milled to a sheet on a rubber mill.

10 parts of the polymer and 0.6 part of 1,3-bis(3-isocyanato-4-methylphenyl)urea are milled together on a rubber mill and cured by heating in a mold in a press at 134° C. for one hour. A smooth rubbery slab results which shows a tensile strength of 1910 lbs./sq. in. at 25° C. It retains elastic properties below 0° C.

EXAMPLE 13

(A) Preparation of polyalkylene-arylene ether glycol 196 parts of polytetramethylene ether glycol having a molecular weight of 980, 79.7 parts of butane-1,4-diol-ditosyl ester and 22.8 parts of diphenylolpropane (molar ratio 2:2:1) are stirred together at 85° C. until in solution. Then 29 parts of powdered potassium hydroxide are added and the mixture is heated at 150–160° C. for 69 hours under an atmosphere of nitrogen. Water evolved during the reaction is removed by the slow stream of nitrogen passing through the vessel. The mass is cooled and poured into 1000 parts of water. The organic portion is extracted with 800 parts of $CCl_4$. The $CCl_4$ layer is washed twice with water and the residual alkalinity is neutralized by adding aqueous HCl until just acid. The layers are separated and the $CCl_4$ layer is washed again with water. The $CCl_4$ is removed by evaporation, the polyether glycol is taken up in benzene, the residual water is removed by azeotropic distillation, the remaining benzene solution is clarified by filtration through diatomaceous earth and the benzene is evaporated at reduced pressure (100° C., at 1 mm. of Hg). The yield is 186 parts of a brown semi-solid waxy material. Analysis shows:

| | |
|---|---|
| OH No. | 61.9 |
| Water percent | .044 |
| Acid No. | 0.36 |
| Mol. wt. | 1810 |

(B) Preparation of elastomer 100 parts of the above polyalkylene-arylene ether glycol and 29.2 parts of 2,4-tolylene diisocyanate are dissolved in 172 parts of toluene and heated at 100° C. for two hours. The toluene is evaporated off during half an hour. The remaining viscous oil is dissolved in 500 parts of tetrahydrofuran and 14.0 parts of water is added. The solution is allowed to stand for 72 hours at which time a dry crumbly gel has formed. The solvent is evaporated and the polymer finally milled on a hot mill to remove residual amounts of tetrahydrofuran.

100 parts of the polymer are compounded with 5 parts of 2,4-tolylene diisocyanate at 134° C. for one hour. The product has a T–50 value of –20° C.

EXAMPLE 14

(A) Preparation of glycol

A polytetramethylene chlorhydrin with a molecular weight of 1460 is prepared by the method used in Example 12(A). Into a vessel fitted with an agitator, thermometer, condenser, and Dean-Stark trap are placed 50 parts of the polytetramethylene ether chlorhydrin, 3.73 parts of 4,4'-biphenyl-dithiol and 2.11 parts of solid potassium hydroxide. The reactants are stirred and heated at 140–160° C. for 44 hours. The reaction mass is cooled and dissolved in 160 parts of benzene. The solids are removed by filtration (principally KCl and KOH). The benzene solution is washed with water until neutral, the benzene is evaporated and the polyarylene-alkylene ether glycol is dried at 130–150° C. for 1.75 hours. Analysis shows 2.08% sulfur compared to a theory of 2.09% and a hydroxyl number of 36.6, which is the theoretical value. The formula is:

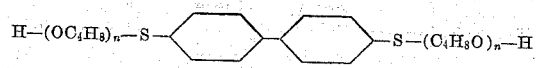

where $n$ is of such value to give an average molecular weight of 1424 to the polyether radical.

(B) Preparation of polymer 15.33 parts of the above polyarylene-alkylene ether glycol, 0.15 part phenyl-$\beta$-naphthylamine (as antioxidant) and 2.07 parts of 2,4-tolylene diisocyanate are put in a vessel and heated for 16 hours at 60° C. 14.84 parts of the resulting reaction product are dissolved in 61 parts of dried tetrahydrofuran and 1.038 parts of water are added. The ingredients are thoroughly agitated to give a homogeneous solution and allowed to stand for 19 hours at 20–25° C. Analysis of the solution shows that no free —NCO groups remain. The solvent is then evaporated and the polymer dried in a vacuum oven at 80° C. for 3 hours.

10 parts of the polymer and 0.8 part of 1,3-bis(3-isocyanato-4-methylphenyl)urea are milled together on a rubber mill and the compounded polymer is cured in a mold in a press at 134° C. for 30 minutes. The resulting elastomer retains its flexibility after 6 days at 0° C.

The elastomers prepared according to this invention have many varied uses. They may be employed in the preparation of tires, inner tubes, belts, hose and tubing, wire and cable jackets, footwear, sponges, coated fabrics, and a wide variety of coated or molded articles. Like the corresponding products formed from polyalkylene ether glycols, they are characterized by a number of advantages properties including excellent resistance to heat and cold, direct sunlight, oxygen and ozone, oil and other hydrocarbon solvents. They display unusually outstanding resistance to mechanical abrasion and to deterioration caused by flexing, stretching and the like. They are particularly useful for fabricating articles to be used at sub-zero temperatures.

As illustrated in the foregoing examples, the elastomers of this invention are substantially superior to the corresponding products prepared from polyalkylene ether glycols in retaining their flexibility at low temperatures. As the elastomers prepared from the reaction of arylene diisocyanates with polyalkylene ether glycols contain aromatic rings, derived from the diisocyanate, in the polymer chain, it is surprising and unexpected that a marked improvement in low temperature properties results from the presence of carbocyclic ring structures in the long-chain glycols.

The elastomeric properties of these materials may be varied by suitable compounding. The amount and type of compounding agent to be incorporated in the stock is dependent upon the use for which the elastomer is intended. The compounding agents ordinarily used with either natural or synthetic rubber are useful with the products of this invention. These include carbon black, clay, silica, talc, zinc and magnesium oxides, calcium and magnesium carbonate, titanium dioxide, and plasticizers. Inorganic and organic coloring agents may be incorporated to give well-defined colors, as the natural color of these elastomers is a pale yellow or light amber.

The compounding agents may be incorporated with the elastomer at the same time as additional diisocyanate is added prior to curing. Conventional rubber processing machinery such as rubber mills or Werner-Pfleiderer or Banbury mixers may be used. The resulting compounded stocks may be shaped and cured in conventional equipment used in the rubber industry.

The compounded uncured elastomers of this invention may be dissolved in or extended with solvents to permit their application as coatings. The action of solvents appears to be quite specific and varies from one elastomer to another. Smooth films can be formed by evaporating the solvent from these dispersions.

The solutions or dispersed gels prepared from the uncured elastomers of this invention may be used for forming supported or unsupported films, for coating fabrics or solid surfaces, and for forming adhesive bonds between a wide variety of plastics, elastomers, fabrics, metals, wood, leather, ceramics and the like.

The present invention is also useful in the formation of cellular articles such as sponges, cushions and heat insulators. In making these, the carbon dioxide generated in reactions yielding the final cured polymer is retained in situ to give the cellular structure. Thus the prepolymer, which is made from the long chain polyether glycol and which contains free isocyanate groups, and free diisocyanate are mixed with water in amount at least equal to that required to react with all the isocyanate groups present and introduced into a mold or other form. As the reaction proceeds, the carbon dioxide formed expands the polymer to fill the mold with the foamed material, which simultaneously hardens. The relative volume of the cells and the density of the sponge may be varied by varying the amount of isocyanate groups. Agents such as glycerol and other polyhydroxy compounds may be included to give greater fluidity to the mass or to otherwise modify the properties of the foam. Tertiary amines and their salts may be added to accelerate the reaction of the water. Examples of these amines are triethylamine and pyridine.

What is claimed is:

1. A polymer having the formula

OCN—(B—NH—CO—O—G—O—CO—NH)$_n$—B—NCO in which B represents a bivalent organic radical, $n$ is an integer greater than zero, and O—G—O represents a long chain bivalent radical having a formula weight of at least 748, and consisting of a plurality of smaller bivalent hydrocarbon radicals linked to one another by chalcogen atoms of atomic weight less than 33, the majority of the said hydrocarbon radicals being alkylene radicals having up to 10 carbon atoms, at least one of the said hydrocarbon radicals containing an intralinear carbocyclic ring structure.

2. The polymer of claim 1 in which B represents an arylene radical.

3. The polymer of claim 1 in which B represents a tolylene radical.

4. The process of preparing the product of claim 1 which comprises reacting a molar excess of an organic diisocyanate with a glycol having the formula

HO—G—OH in which O—G—O represents a long chain bivalent radical having a formula weight of at least 748, and consisting of a plurality of smaller bivalent hydrocarbon radicals linked to one another by chalcogen atoms of atomic weight less than 33, the majority of the said hydrocarbon radicals being alkylene radicals having up to 10 carbon atoms, at least one of the said hydrocarbon radicals containing an intralinear carbocyclic ring structure.

5. The process of preparing polymers which comprises reacting a polymer of claim 1 with a chain-extending agent having a plurality of active hydrogen atoms capable of reacting with isocyanates, no more than two atoms in the molecule of the said chain-extending agent having active hydrogen attached thereto, said chain-extending agent being selected from the class consisting of water, hydrogen sulfide and organic compounds containing two functional groups in the molecule to which are attached active hydrogen atoms.

6. The process of claim 5 in which the chain-extending agent is water.

7. The process of claim 5 in which the chain-extending agent is an arylene diamine.

8. The process of claim 5 in which the chain-extending agent is tolylene diamine.

9. A polymer being comprised essentially of structural units having the formula

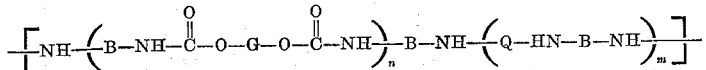

wherein O—G—O is a long-chain bivalent organic radical having a formula weight of at least 748 and consisting of a plurality of smaller bivalent hydrocarbon radicals linked to one another by chalcogen atoms of atomic weight less than 33, the majority of the said smaller bivalent hydrocarbon radicals being alkylene radicals having up to 10 carbon atoms with at least one of the said smaller bivalent hydrocarbon radicals containing an intralinear carbocyclic ring structure; B is a bivalent organic radical, said radical being inert to isocyanate groups; Q is a radical selected from the group consisting of a carbonyl radical and a nonpolymeric diacyl radical; $n$ is an integer greater than zero; and $m$ is an integer including zero; each of the said structural units being connected to the next by a radical Q having the significance defined above; at least 35% of the total weight of the polymer being the bivalent radicals O—G—O.

10. The polymer of claim 9 in which the alkylene radicals present in the long-chain bivalent organic radical O—G—O are tetramethylene radicals.

11. The polymer of claim 9 wherein at least one of the smaller bivalent hydrocarbon radicals present in the long-chain bivalent organic radicals O—G—O contains an intralinear aromatic ring structure.

12. The polymer of claim 9 wherein the long-chain bivalent organic radical O—G—O is the radical

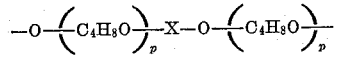

wherein $p$ is an integer large enough so that the radicals within the parentheses have formula weights of from 500 to 1000 and X is selected from the group consisting of phenylene, naphthylene, cyclohexylene and xylylene radicals.

13. The polymer of claim 9 wherein the bivalent organic radical B is an arylene radical.

14. The polymer of claim 12 wherein the bivalent organic radical B is a 2,4-tolylene radical.

15. The polymer of claim 14 wherein Q is a carbonyl radical.

16. The polymer of claim 14 wherein Q is the nonpolymeric diacyl radical

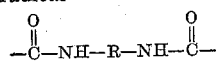

wherein R is a radical selected from the group consisting of alkylene and arylene radicals.

17. The polymer of claim 14 wherein Q is the nonpolymeric diacyl radical

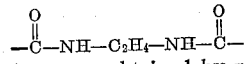

18. A cured elastomer obtained by reacting the polymer of claim 9 with an organic polyisocyanate.

19. The polymer of claim 9 in the form of a thin, pliable, unsupported film.

References Cited in the file of this patent

UNITED STATES PATENTS

| | | |
|---|---|---|
| 2,060,715 | Arvin | Nov. 10, 1936 |
| 2,292,406 | Rothrock | Aug. 11, 1952 |
| 2,602,075 | Carpenter | July 1, 1952 |
| 2,692,874 | Langerak | Oct. 26, 1954 |
| 2,702,797 | Rugg | Feb. 22, 1955 |

FOREIGN PATENTS

| | | |
|---|---|---|
| 52,968 | France | July 17, 1944 |
| | (1st addition to No. 845,917.) | |
| 1,074,451 | France | Mar. 31, 1954 |